United States Patent
Tonegawa

(10) Patent No.: US 11,245,798 B2
(45) Date of Patent: Feb. 8, 2022

(54) INFORMATION PROCESSING APPARATUS, CONTROL METHOD THEREFOR, AND STORAGE MEDIUM

(71) Applicant: CANON KABUSHIKI KAISHA, Tokyo (JP)

(72) Inventor: Nobuyuki Tonegawa, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/595,177

(22) Filed: Oct. 7, 2019

(65) Prior Publication Data
US 2020/0120220 A1 Apr. 16, 2020

(30) Foreign Application Priority Data
Oct. 16, 2018 (JP) .............................. JP2018-194861

(51) Int. Cl.
*H04N 1/00* (2006.01)
(52) U.S. Cl.
CPC ..... *H04N 1/00212* (2013.01); *H04N 1/00225* (2013.01); *H04N 1/00307* (2013.01)
(58) Field of Classification Search
None
See application file for complete search history.

(56) References Cited

U.S. PATENT DOCUMENTS

| 8,228,299 B1* | 7/2012 | Maloney | ........... G06Q 20/40145 345/173 |
|---|---|---|---|
| 2003/0126443 A1* | 7/2003 | Wakao | ................. G06Q 20/401 713/176 |
| 2003/0138135 A1* | 7/2003 | Chung | ............... G06K 7/10346 382/119 |
| 2003/0159044 A1* | 8/2003 | Doyle | ..................... G06F 21/64 713/176 |
| 2003/0212893 A1* | 11/2003 | Hind | ...................... H04L 9/3247 713/177 |
| 2004/0194108 A1* | 9/2004 | Masui | ................... G06F 21/645 718/105 |
| 2005/0091338 A1* | 4/2005 | de la Huerga | ....... H04L 63/108 709/217 |
| 2006/0031677 A1* | 2/2006 | Ohta | ..................... H04L 9/3234 713/176 |
| 2006/0031678 A1* | 2/2006 | Yasuhara | .............. H04L 9/3247 713/176 |

(Continued)

FOREIGN PATENT DOCUMENTS

| JP | 2006-262408 A | 9/2006 |
|---|---|---|
| JP | 2013-201786 A | 10/2013 |

*Primary Examiner* — Anh-Vinh Thi Nguyen
(74) *Attorney, Agent, or Firm* — Canon U.S.A., Inc. IP Division

(57) ABSTRACT

A multi-function peripheral (MFP) includes a function of performing a setting to attach an electronic signature to a file including data acquired by executing scanning of a document, attaching, based on the setting, at least one of a plurality of electronic signatures to the file including the data acquired by executing scanning of the document in response to a request received from a smartphone, the electronic signatures including a user signature corresponding to an authenticated user and a device signature corresponding to the MFP, and transmitting the file to which the electronic signature is attached to a communication terminal or the like.

11 Claims, 13 Drawing Sheets

(56) References Cited

U.S. PATENT DOCUMENTS

| | | | |
|---|---|---|---|
| 2006/0047966 A1* | 3/2006 | Iwamura | H04N 1/32128 713/176 |
| 2006/0075247 A1* | 4/2006 | Stevens | H04L 9/3247 713/178 |
| 2006/0106836 A1* | 5/2006 | Masugi | H04L 63/104 |
| 2006/0209333 A1* | 9/2006 | Takida | H04N 1/32106 358/1.15 |
| 2007/0086061 A1* | 4/2007 | Robbins | H04N 1/32133 358/400 |
| 2007/0136599 A1* | 6/2007 | Suga | H04L 9/3247 713/176 |
| 2007/0171485 A1 | 7/2007 | Yachida | |
| 2007/0188797 A1* | 8/2007 | Terao | H04L 51/066 358/1.15 |
| 2008/0010218 A1* | 1/2008 | Zank | G06F 21/64 705/75 |
| 2008/0120506 A1* | 5/2008 | Yamauchi | H04L 9/3263 713/176 |
| 2009/0017795 A1* | 1/2009 | Guichard | H04N 1/00318 455/414.1 |
| 2009/0077654 A1* | 3/2009 | Hong | G06F 21/34 726/20 |
| 2009/0083372 A1* | 3/2009 | Teppler | H04L 9/3226 709/203 |
| 2010/0011286 A1* | 1/2010 | Isoda | G06T 11/00 715/246 |
| 2010/0303230 A1* | 12/2010 | Taveau | G06F 21/35 380/30 |
| 2010/0306545 A1* | 12/2010 | Seki | H04L 63/0823 713/175 |
| 2011/0126004 A1* | 5/2011 | Kawana | H04L 63/126 713/156 |
| 2011/0255122 A1* | 10/2011 | Kato | G06F 3/1204 358/1.14 |
| 2011/0317227 A1* | 12/2011 | Makishima | H04N 1/00421 358/474 |
| 2012/0278613 A1* | 11/2012 | Ota | H04L 9/3265 713/156 |
| 2013/0050512 A1* | 2/2013 | Gonser | H04N 1/32112 348/207.1 |
| 2013/0148024 A1* | 6/2013 | Shin | H04N 21/441 348/552 |
| 2013/0286417 A1* | 10/2013 | Patara | H04N 1/32106 358/1.13 |
| 2014/0003675 A1* | 1/2014 | Li | G06K 9/222 382/123 |
| 2014/0168702 A1* | 6/2014 | Morita | G06F 21/645 358/1.15 |
| 2014/0268243 A1* | 9/2014 | Mitsubori | H04N 1/42 358/402 |
| 2015/0163206 A1* | 6/2015 | McCarthy | G06F 21/10 713/171 |
| 2015/0312044 A1* | 10/2015 | Tonegawa | H04L 51/30 713/176 |
| 2015/0358400 A1* | 12/2015 | Bartlett, II | H04W 4/80 709/201 |
| 2016/0261413 A1* | 9/2016 | Kirsch | H04L 9/30 |
| 2016/0274745 A1* | 9/2016 | Baba | H04N 1/04 |
| 2017/0041296 A1* | 2/2017 | Ford | H04W 12/06 |
| 2017/0364911 A1* | 12/2017 | Landrok | H04L 9/3228 |
| 2018/0268157 A1* | 9/2018 | Kamiya | G06F 3/1423 |
| 2019/0141201 A1* | 5/2019 | Tonegawa | H04N 1/00214 |
| 2019/0340369 A1* | 11/2019 | Hadi | G06K 9/00161 |
| 2020/0067705 A1* | 2/2020 | Brown | H04L 9/3231 |
| 2020/0120220 A1* | 4/2020 | Tonegawa | H04N 1/00307 |

* cited by examiner

FIG.4

| SCAN | | |
|---|---|---|
| 250 — READING SIZE | AUTOMATIC | AUTOMATIC, A3, A4, LTR, 11 × 17 |
| 251 — RESOLUTION | 200 dpi | 200/300/400/600 dpi |
| 252 — COLOR MODE | FULL-COLOR | FULL-COLOR/GRAY/MONOCHROME |
| 253 — DOCUMENT IMAGE QUALITY | TEXT/PICTURE | TEXT/PICTURE, TEXT, PICTURE |
| 254 — FILE FORMAT | PDF | PDF, HIGH-COMPRESSION PDF, JPEG, TIFF |
| 255 — DOCUMENT PLACE | ADF/SINGLE-SIDED | ADF/SINGLE-SIDED, ADF/DOUBLE-SIDED, PRESSING PLATE |
| 256 — PDF SETTING | DEVICE SIGNATURE | DEVICE SIGNATURE, USER SIGNATURE, TIMESTAMP |
| 257 — TRANSMISSION DESTINATION | SMARTPHONE | SMARTPHONE, CLOUD STORAGE |

SCAN — 258

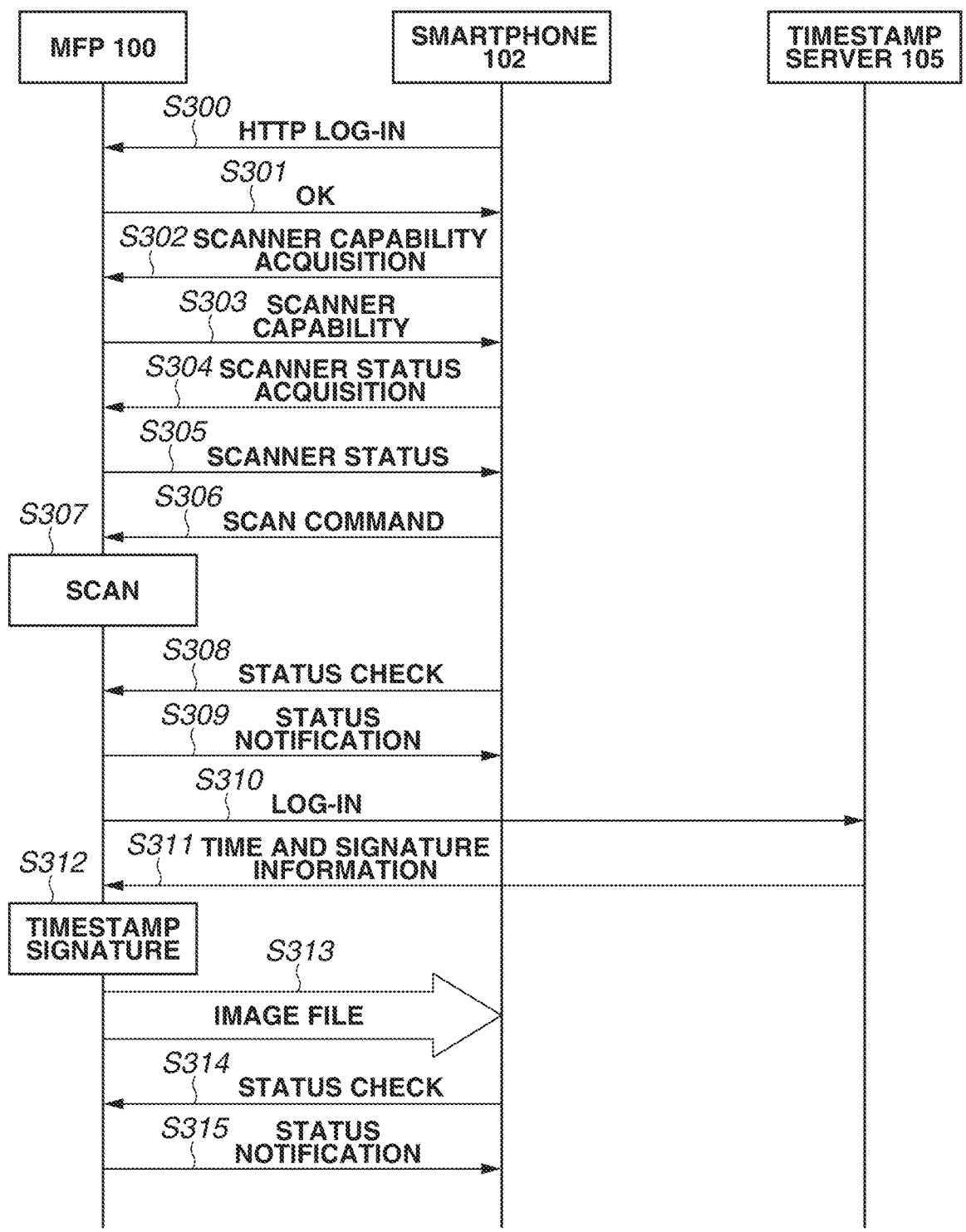

INFORMATION PROCESSING APPARATUS, CONTROL METHOD THEREFOR, AND STORAGE MEDIUM

BACKGROUND OF THE INVENTION

Field of the Invention

The present invention relates to a technique for transmitting a file including data acquired by executing scanning of a document in response to a request from a communication terminal such as a smartphone.

Description of the Related Art

A function of operating an operation panel of a multi-function peripheral (MFP) to transmit an image read by a scanner to an electronic mail server or a file server has been widely used.

However, this function has been abused in cases where classified documents are scanned and information about the scanned classified documents is leaked to the outside. To prevent such an abuse, there is a function of performing user authentication before scanning is performed by an MFP, attaching an electronic signature of an authenticated user to scanned text, or attaching an electronic signature in which the body number of the MFP which has executed scanning is described to an image file, and transmitting the scanned text or the image file.

The function of attaching the electronic signature of the authenticated user to the scanned text or attaching the electronic signature in which the body number of the MFP is described makes it possible to identify a user or device that has executed scanning. This function acts as a deterrent against leakage of classified documents.

Internet Printing Protocol (IPP) standards are set by the Printing Working Group (PWG), which is a part of the Institute of Electrical and Electronics Engineers (IEEE) that has set standards in the communication, electronics, and information engineering fields. The standards include a standard related to a push scan function of issuing a scan command from a terminal, such as a smartphone, reading an image by a scanner of an MFP, and transmitting the read image to the smartphone. In this standard, the MFP and the smartphone communicate with each other using a Hypertext Transfer Protocol (HTTP) and Extensible Markup Language (XML) data.

Japanese Patent Application Laid-Open No. 2006-262408 discusses a push scan technique for transmitting an electronic document with a signature using an integrated circuit (IC) card.

Japanese Patent Application Laid-Open No. 2013-201786 discusses a technique for a signature with a timestamp, and also describes a pull scan technique for executing scanning from a personal computer (PC).

Along with the popularization of smartphones, scan applications have been implemented on smartphones.

As an example of scan applications to be implemented on smartphones, a scan application having the following configuration has been devised. That is, the scan application enables a variety of kinds of scan devices manufactured by different manufacturers, and scan devices including inexpensive scanners and sophisticated MFPs, to execute scanning using the same application.

From the viewpoint of security, it is necessary for a scanner device to send data with a signature even in the case of using the scan application to be implemented on each smartphone. However, there is no scan application for providing users with options for setting an electronic signature. For example, the general-purpose scan application as described above needs to be compliant with all types of scan devices, which makes it difficult to provide a function of providing users with options for setting an electronic signature.

As a result, even when scan devices, such as a scanner and an MFP, are provided with a function of attaching an electronic signature, if scanning is performed from the scan application, a file with no electronic signature can be acquired, which inhibits the function from acting as a deterrent against leakage of information.

SUMMARY OF THE INVENTION

According to an aspect of the present invention, an information processing apparatus includes at least one memory storing instructions and at least one processor executing the instructions causing the information processing apparatus to perform a setting to attach an electronic signature to a file including data acquired by executing scanning of a document, receive a request for scanning the document from a communication terminal via a network, attach, based on the setting, at least one of a plurality of electronic signatures to the file including the data acquired by executing scanning of the document in response to the request, the electronic signatures including a user signature corresponding to an authenticated user and a device signature corresponding to the information processing apparatus, and transmit the file to which the electronic signature is attached to one of the communication terminal and a designated destination.

Further features of the present invention will become apparent from the following description of embodiments with reference to the attached drawings.

BRIEF DESCRIPTION OF THE DRAWINGS

FIG. 4 illustrates a scan application screen.

FIG. 5 illustrates a processing sequence for designating a timestamp.

DESCRIPTION OF THE EMBODIMENTS

Figure 1:
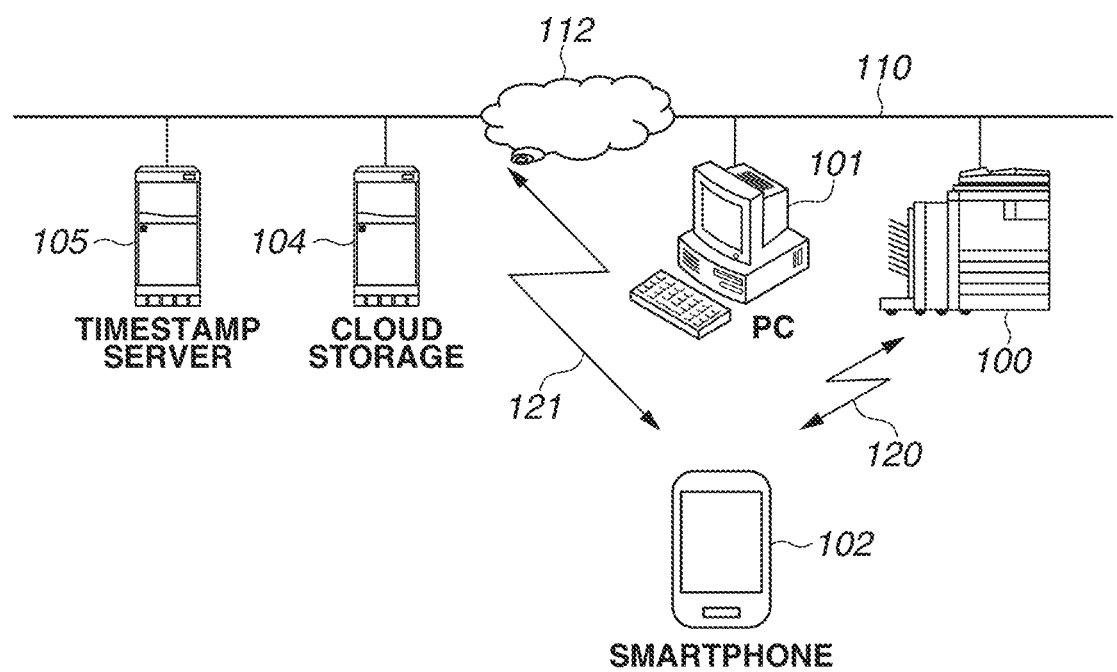
FIG. 1 illustrates an example of a configuration of a system including an information processing apparatus according to an embodiment of the present invention.

FIG. 1 illustrates an example of a configuration of a system including an information processing apparatus according to an embodiment of the present invention.

A multi-function peripheral (MFP) 100 illustrated in FIG. 1 is an example of the information processing apparatus according to an embodiment of the present invention. The MFP 100 is, for example, an MFP which employs an electrophotographic method and includes a copy function, a facsimile (FAX) function, a printer function, and a scanner function of scanning a document. The MFP 100 is communicably connected to a network 110. The network 110 is connected to a personal computer (PC) 101 and the like. The network 110 is also connected to the Internet 112.

A cloud storage 104 and the like are present on the Internet 112. The Internet 112 enables an access to a file from remote locations.

A timestamp server 105 is present on the Internet 112. The timestamp server 105 can keep an accurate time, transmit, upon reception of a request for attaching an electronic signature, accurate time information or electronic signature data in which the accurate time information is described, and attach an electronic signature to text or the like.

A smartphone 102 is a communication terminal including a telephone function.

The smartphone 102 includes an interconnection wireless local area network (LAN) that enables communication between devices using the Institute of Electrical and Electronics Engineers (IEEE) 802.11 Wireless Fidelity (Wi-Fi) standard, which is international standard. The smartphone 102 can communicate with the MFP 100 by wireless communication using Wi-Fi 120.

The smartphone 102 also supports a communication method for third generation mobile communication system (3G) digital smartphones in compliance with the IMT-2000 standard defined by the International Telecommunication Union (ITU). The smartphone 102 is connected to the Internet 112 via a wireless network 121 which is provided by a cellular phone company.

It is assumed that, for example, a communication terminal on which a mobile operating system (OS), such as Android, iOS, or Windows Phone is executed, is used as the smartphone 102. However, an OS other than those described above may also be used.

Instead of using the smartphone 102, for example, another communication terminal (such as a tablet terminal) that operates using a mobile OS as described above may be used.

Figure 2:
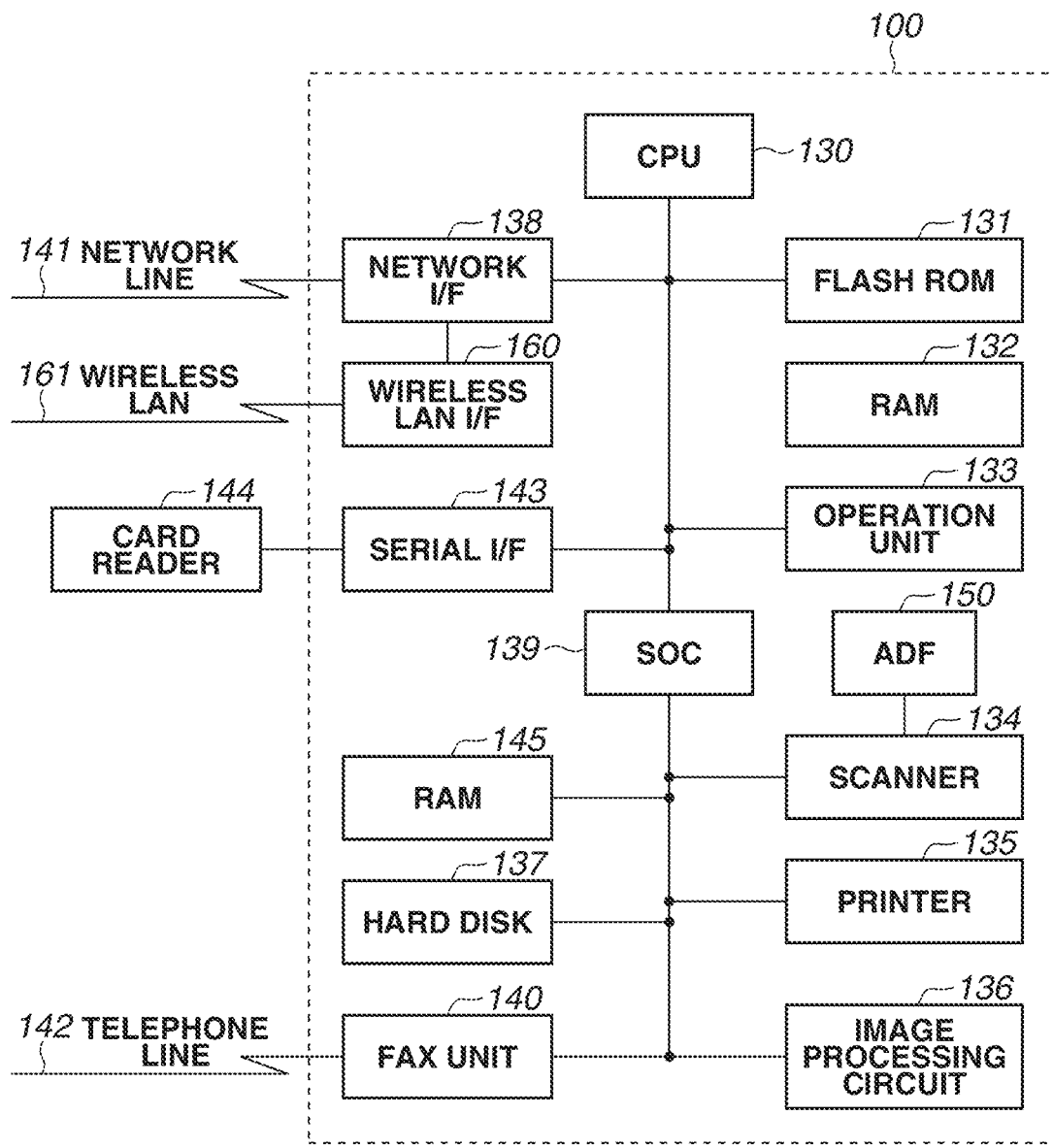
FIG. 2 illustrates an example of a configuration of a multi-function peripheral (MFP).

FIG. 2 illustrates an example of a configuration of the MFP 100.

A central processing unit (CPU) 130 illustrated in FIG. 2 is a control circuit that performs system control using a program stored in a flash read-only memory (ROM) 131 and a random access memory (RAM) 132.

The flash ROM 131 stores not only system programs, but also various kinds of setting data on devices, and the like.

An operation unit 133 is a circuit that includes a liquid crystal display (LCD) touch panel and hardware keys such as a start key and a numeric keypad, displays a button on the LCD in a software manner, detects a touch on the button by a user's finger, and smoothly executes a user operation.

A network interface (I/F) 138 is a circuit for connecting with a network line such as Ethernet®.

A wireless LAN I/F 160 is a circuit for performing wireless LAN communication using the Wi-Fi 120 or the like, and transmitting and receiving radio waves through a wireless LAN antenna 161.

A serial I/F 143 is a serial I/F, such as RS232C, and is used to connect an external serial device to the MFP 100. A card reader 144 is connected to the serial I/F 143, thereby enabling reading of information recorded on an integrated circuit (IC) card. The IC card is distributed to each user who uses the MFP 100. A card identification (ID) recorded on the IC card is read by the card reader 144 to identify the user who owns the IC card.

A system-on-a-chip (SOC) 139 is a second CPU provided in the MFP 100. The SOC 139 is a circuit that controls devices, such as a scanner and a printer, which are requested to perform real-time processing. The SOC 139 executes processing using a RAM 145 and control programs stored in the flash ROM 131.

A scanner 134 has a configuration in which a light source such as a light emitting diode (LED), a light receiving lens, a charge-coupled device (CCD) image sensor or a contact image sensor, and the like are aligned in the shape of a rod. The scanner 134 applies light to a document, reads reflected light with a sensor, and forms image data, thereby implementing a scan function.

An auto document feeder (ADF) 150 is an automatic document feeder to be mounted on the scanner 134. The ADF 150 automatically feeds a plurality of documents and reads the documents with the scanner 134.

A printer 135 irradiates a charged drum with laser light, causes toner to adhere to the surface of the drum by static electricity along with a print image, and causes the toner to be fixed onto a print sheet, thereby printing the image on the print sheet. In the case of using a color printer, four colors of toner, i.e., cyan, magenta, yellow, and black, are applied in a superimposed manner, or the four colors of toner are placed on a transfer belt and the entire image is transferred at once. In the present embodiment, the printer 135 is configured to perform printing using an electrophotographic printing method, but instead may be configured to perform printing using another printing method such as an inkjet method.

An image processing circuit 136 is configured using, for example, a large-capacity image memory, an image rotation circuit, a resolution magnification circuit, and an encryption/decryption circuit that uses an encoding method such as Modified Huffman (MH), Modified Read (MR), Modified MR (MMR), Joint Bi-level Image Experts Group (JBIG), or Joint Photographic Experts Group (JPEG), and executes various image processes such as shading, trimming, and masking.

A hard disk 137 is a large-capacity recording medium to be connected via an I/F of serial advanced technology attachment (SATA), integrated drive electronics (IDE), or the like, and stores image data and intermediate data required for various processes.

In the MFP 100, page description language (PDL) data is received from the PC 101 or the like via the network I/F 138, and the SOC 139 renders an image to be printed by the printer 135 and creates image data. Then, the image processing circuit 136 performs image processing on the created image data and the printer 135 performs printing, thereby implementing a print function.

Further, in the MFP 100, the image processing circuit 136 performs image processing on image data read by the scanner 134 and the printer 135 prints the read image, thereby implementing a copy function.

A FAX unit 140 controls facsimile communication with an external apparatus on a telephone line 142. Specifically, in the MFP 100, the image processing circuit 136 performs image processing on image data read by the scanner 134 and transmits the image data to the external apparatus via the telephone line 142. Alternatively, in the MFP 100, data is received from an external apparatus via the telephone line 142, the image processing circuit 136 performs image processing on the received data, and the printer 135 performs printing based on the data.

The MFP 100 includes a SEND function.

In the SEND function, the image processing circuit 136 creates an image in the format of JPEG, Portable Document Format (PDF), Tagged Image File Format (TIFF), or the like based on image data read by the scanner 134. Further, in the SEND function, the created image is transmitted from the network I/F 138 and the wireless LAN I/F 160 via a communication protocol such as a Simple Mail Transfer Protocol (SMTP), a File Transfer Protocol (FTP), or a Server Message Block (SMB).

The SEND function is categorized into file transmission, electronic mail transmission, Internet facsimile (IFAX) transmission, and FAX transmission.

A function of transmitting an image file in the format of JPEG, PDF, TIFF, or the like via the SMTP is referred to as "electronic mail transmission".

A function of transmitting a file via a transmission protocol such as FTP, SMB, or Web-based Distributed Authoring and Versioning (WebDAV) is referred to as "file transmission".

"IFAX transmission" implements a facsimile function as defined in RFC 2305 by transmitting and receiving an image file attached to an electronic mail between devices of the same type. In "IFAX transmission", the image processing circuit 136 creates a TIFF file, which is defined in RFC3949, based on image data read by the scanner 134, and transmits the created TIFF file via the SMTP. Through this electronic mail, the TIFF file is received using an SMTP or Post Office Protocol (POP) 3 function, and the image processing circuit 136 changes the TIFF file into an image of an internal file format, and then the printer 135 prints the image.

In "FAX transmission", the FAX unit 140 is used to connect to the telephone line 142 and perform Group 3 (G3) FAX transmission.

Figure 13:
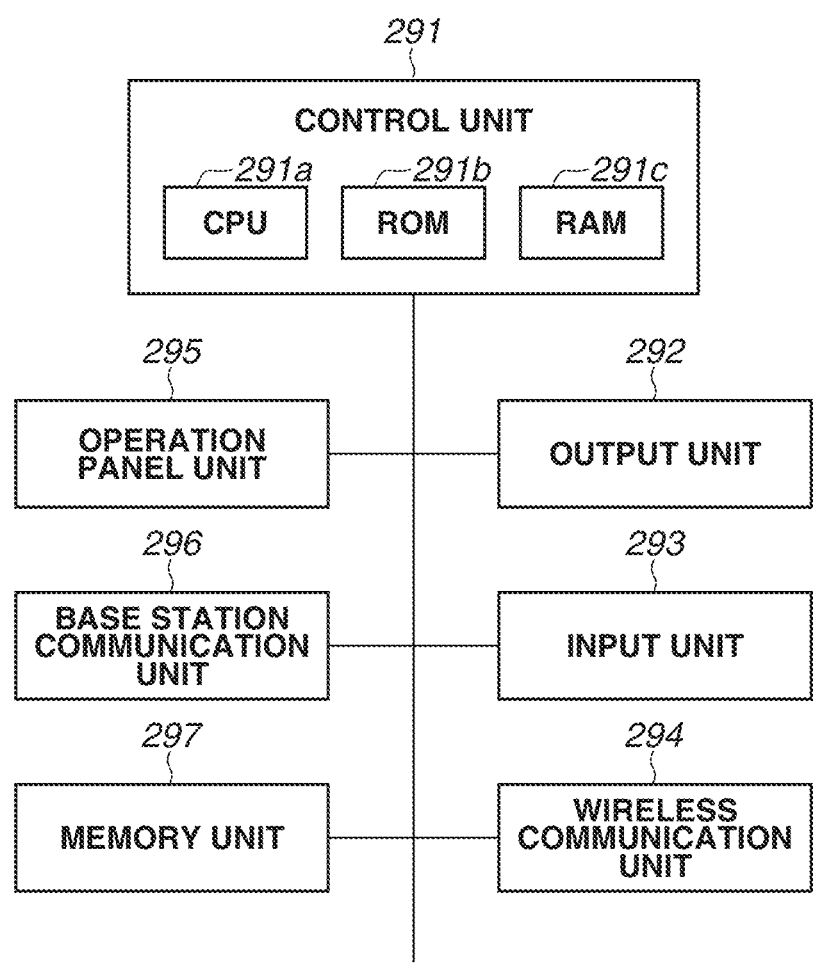
FIG. 13 illustrates an example of a configuration of the smartphone.

FIG. 13 illustrates an example of a configuration of the smartphone 102.

The smartphone 102 includes, for example, a control unit 291, an output unit 292, an input unit 293, a wireless communication unit 294, an operation panel unit 295, a base station communication unit 296, and a memory unit 297. The configuration illustrated in FIG. 13 is merely an example. The smartphone 102 may include hardware elements other than those described above, and some of the hardware elements may be omitted. A single element obtained by integrating a plurality of hardware functions illustrated in FIG. 13 as separate elements may be used instead of the separate elements. Each hardware element may be implemented by one or more hardware elements (circuits and the like).

The control unit 291 includes at least one processor, such as a CPU or an application specific integrated circuit (ASIC) for controlling the hardware elements described above. The control unit 291 also includes a temporary storage device, such as a RAM, which is capable of performing a high-speed writing/reading operation and temporarily holds data and the like required for a control operation. Further, the control unit 291 may include a ROM that stores predetermined programs, various kinds of data, and the like. Assume here that the control unit 291 includes a CPU 291a, a ROM 291b, and a RAM 291c.

The control unit 291 reads programs stored in, for example, the ROM 291b, and executes the read programs, thereby controlling the overall operation of the smartphone 102. Programs and various kinds of information may be stored in the memory unit 297. The memory unit 297 can also store contact information, such as a telephone number used for cellular communication, and image data on digital pictures, documents, and the like. The memory unit 297 or the ROM 291b included in the control unit 291 can also store programs and the like for driver software used to set functions for the image forming apparatus.

The input unit 293 includes, for example, a camera that captures a video image by image capturing, and a microphone that receives an audio input. The input unit 293 receives an input of information from an external apparatus. The output unit 292 includes, for example, a liquid crystal monitor that outputs a video image, and a speaker that outputs voice. The output unit 292 outputs information to be transmitted to the user to an external apparatus in a format that can be recognized by the user. The operation panel unit 295 includes various buttons and the like for receiving a user operation. For example, the output unit 292 and the operation panel unit 295 may be implemented by a single touch panel.

The wireless communication unit 294 is a circuit that performs wireless LAN communication using Wi-Fi 120 or the like, and transmits and receives radio waves through the wireless LAN antenna 161. The wireless communication unit 294 may be configured to be compliant with wireless communication using a Bluetooth® communication method or the like.

Assume that other communication terminals, such as tablet terminals, which can be used instead of the smartphone 102, have a configuration similar to the configuration of the smartphone 102 described above.

Figure 3:
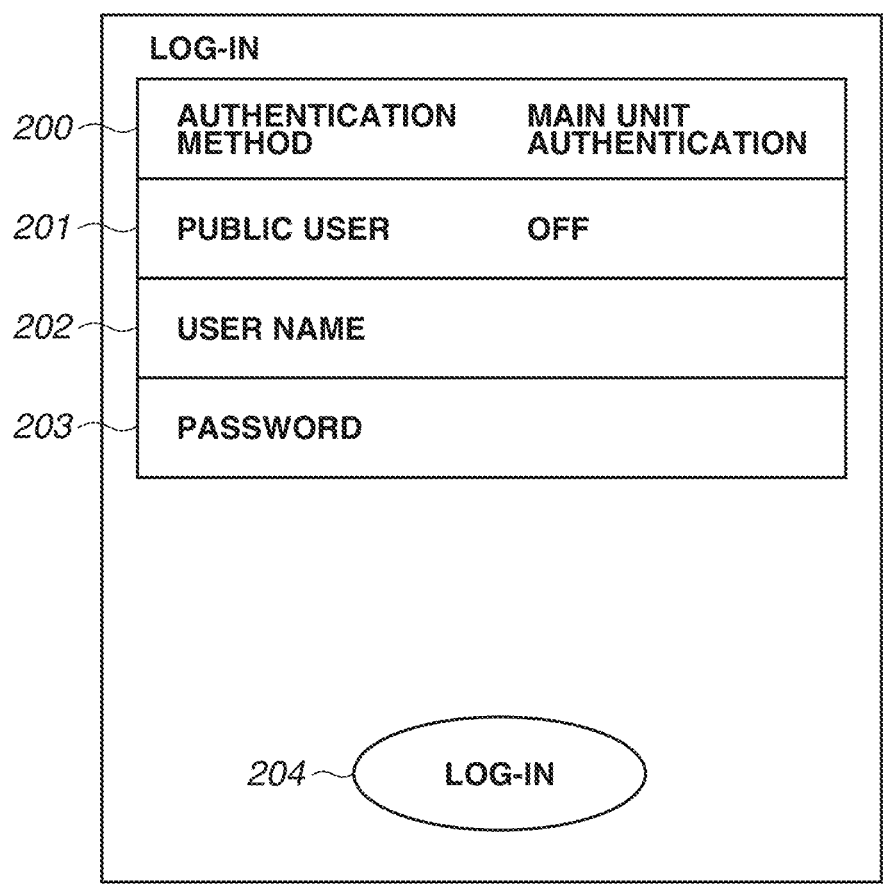
FIG. 3 illustrates a log-in screen of a smartphone.

FIG. 3 illustrates a log-in screen of the smartphone 102.

The log-in screen illustrated in FIG. 3 is a screen to be displayed on the output unit 292 under control of the control unit 291 of the smartphone 102 when a scan application implemented on the smartphone 102 is activated. This log-in screen is used to select, for example, a user type to log in to the MFP 100.

On the log-in screen, an authentication method 200 is used to select an authentication method to be used. Assume that in the present embodiment, there are two authentication methods, i.e., "main unit authentication" and "external server authentication". In the "main unit authentication", a log-in operation is performed by a user who is registered in the MFP 100. In the "external server authentication", the log-in operation is performed by a user who is registered in an external authentication server.

A public user 201 is a switch for selecting whether to log in as a public user whose authority is temporarily limited. When the public user 201 is turned "ON", the area of each of a user name 202 and a password 203 is changed into a hatched area, so that no information can be input to the area of each of the user name 202 and the password 203. When the public user 201 is turned "OFF", information can be input to the area of each of the user name 202 and the password 203, so that the user can log in to the MFP 100 with the input user name.

A log-in button 204 is a button for requesting to log in to the MFP 100. If the log-in operation is successful, scanner capabilities are acquired from the MFP 100 under control of the control unit 291 of the smartphone 102, and a scan application screen illustrated in FIG. 4 is displayed on a display unit.

FIG. 4 illustrates the scan application screen.

The scan application screen illustrated in FIG. 4 is a screen to be displayed on the output unit 292 under control of the control unit 291 of the smartphone 102 based on the scan application. This scan application screen is a screen for designating settings for scanning in the MFP 100. The scan application screen is displayed based on capability information acquired from the MFP 100 during the log-in operation. Specifically, options in items 250 to 257 as described below are determined based on the capability information acquired from the MFP 100.

On the scan application screen, the reading size 250 is an item for designating a size with which a document placed on the ADF 150 or a pressing plate of the scanner 134 is to be read.

If "automatic" is selected in the reading size 250, the document is read with a size detected by the ADF 150 or the scanner 134. If a predefined size, such as A3, A4, letter (LTR), or 11×17, is selected in the reading size 250, the document is read with the predefined size.

The resolution 251 is an item for designating a resolution (such as 200 dpi, 300 dpi, 400 dpi, or 600 dpi) with which the document is to be read.

The color mode 252 is an item for selecting one of full-color, grayscale, and a black and white binary image to read the document.

The document image quality 253 is an item for selecting one of a text/picture mode for reading a document including text and pictures, a text mode for reading a text document, and a picture mode for reading a picture document. The image processing circuit 136 performs processing on the document read by the scanner 134 so as to optimize the quality of the document with a selected document image quality.

The file format 254 is an item for selecting an image file format to be used to transmit the scanned document. As the file format 254, for example, PDF, high-compression PDF, JPEG, and TIFF can be selected. High-compression PDF is implemented by separating the area of an image into a text area and a picture area and reducing the size of the image by changing a compression method depending on the determination result for each area. JPEG is displayed when "full-color" or "gray" are selected in the color mode 252, and JPEG cannot be selected when "monochrome" is selected in the color mode 252. TIFF is displayed only when "monochrome" is selected in the color mode 252, and TIFF is not displayed when "full-color" or "gray" is selected in the color mode 252.

The document place 255 is an item for selecting a place where reading of a document is started, and the place can be selected from among items of "ADF/single-sided", "ADF/double-sided", and "pressing plate". If "ADF/double-sided" is selected, the document placed on the ADF 150 is read as a double-sided document.

The PDF setting 256 is an item that can be selected when "PDF" or "high-compression PDF" is set in the file format 254. In the PDF setting 256, for example, "device signature", "user signature", and "timestamp" can be selected. The PDF setting 256 indicates that an electronic signature is attached to a PDF file to be transmitted.

The transmission destination 257 is an item for selecting a destination where an image generated based on a scanned document is to be transmitted. For example, the destination can be selected from among items of "smartphone" and "cloud storage".

A scan button 258 is a button for instructing the MFP 100 to start reading of a document with contents set in the items 250 to 257 described above.

FIG. 5 illustrates processing sequences of each of the MFP 100, the smartphone 102, and the timestamp server 105 when "timestamp" is designated in the PDF setting 256. In sequence diagrams of FIG. 5 and FIGS. 6 and 7 to be described below, the processing of the MFP 100 is implemented in such a manner that the CPU 130 reads a program stored in the flash ROM 131 or the like and executes the read program. The processing of the smartphone 102 is implemented in such a manner that the CPU 291a of the control unit 291 reads a program stored in the ROM 291b or the like and executes the read program. The processing of the timestamp server 105 is implemented in such a manner that a CPU (not illustrated) of the timestamp server 105 reads a program stored in a hard disk or the like and executes the read program.

When the log-in button 204 is pressed on the log-in screen (FIG. 3) of the smartphone 102, in step S300, a Hypertext Transfer Protocol (HTTP) log-in command is issued from the smartphone 102 with an HTTP protocol. Then, in step S301, the MFP 100 performs authentication and transmits the authentication result to the smartphone 102. The authentication to be performed by the MFP 100 may be performed within the device, or may be performed in cooperation with an external authentication server.

If the authentication is successful, in step S302, the smartphone 102 issues a scanner capability acquisition command. In response to the scanner capability acquisition command, in step S303, the MFP 100 sends capability information, such as the reading size and the resolution, which can be set in the items 250 to 256 illustrated in FIG. 4, to the smartphone 102 as scanner capabilities. For example, the MFP 100 sends information indicating that automatic, A3, A4, LTR, or 11×17 can be set as the reading size and information indicating that 200 dpi, 300 dpi, 400 dpi, or 600 dpi can be set as the resolution to the smartphone 102 as scanner capabilities.

Next, in step S304, the smartphone 102 issues a scanner status acquisition command to recognize whether the MFP 100 can start scanning or cannot start scanning due to a sheet jam or the like. In response to the scanner status acquisition command, in step S305, the MFP 100 notifies the smartphone 102 of the scanner status.

In steps S302 to S305 described above, the smartphone 102 which has acquired the scanner capabilities and the scanner status displays items present as the acquired scanner capabilities as indicated by the items 250 to 257 illustrated in FIG. 4. When the MFP 100 is ready to start scanning, the smartphone 102 displays the scan button 258.

The user performs various settings on the smartphone 102 as illustrated in FIG. 4, sets the smartphone 102 as the transmission destination 257, and presses the scan button 258. Then, in step S306, the smartphone 102 transmits a scan command (a command for requesting the MFP 100 to scan a document) to the MFP 100.

In step S307, the MFP 100 which has received this command (scan command) drives the scanner 134 to execute scanning.

In steps S308 and S314, the smartphone 102 intermittently issues a status check immediately after the scan command is issued and repeatedly executes the status check until the status check to be performed when the transmission of the image file ends.

In steps S309 and S315, the MFP 100 which has received a status check command returns a status, such as "being scanned", "being transmitted", or "standby", as a status notification in response to the status check command.

If "timestamp" is designated in the scan command setting (PDF setting 256), in step S310, the MFP 100 logs in to the timestamp server 105. If the MFP 100 can normally log in to the timestamp server 105, in step S311, the timestamp server 105 returns to the MFP 100 signature information in which correct time information is described.

In step S312, the MFP 100 attaches a timestamp signature based on the information received from the timestamp server 105, to the PDF file created by scanning a document (i.e., data acquired by executing scanning of a document). Further, in step S313, the MFP 100 transmits this image file (PDF file to which the timestamp is attached) to the smartphone 102.

Assume that in the present embodiment, the MFP 100 acquires time information from the timestamp server 105, creates a timestamp signature (electronic signature) based on the information, and attaches the created timestamp signature to scanned data. However, the MFP 100 may receive the timestamp signature (electronic signature) created by the timestamp server 105 and may attach the timestamp signature to the scanned data.

Figure 6:
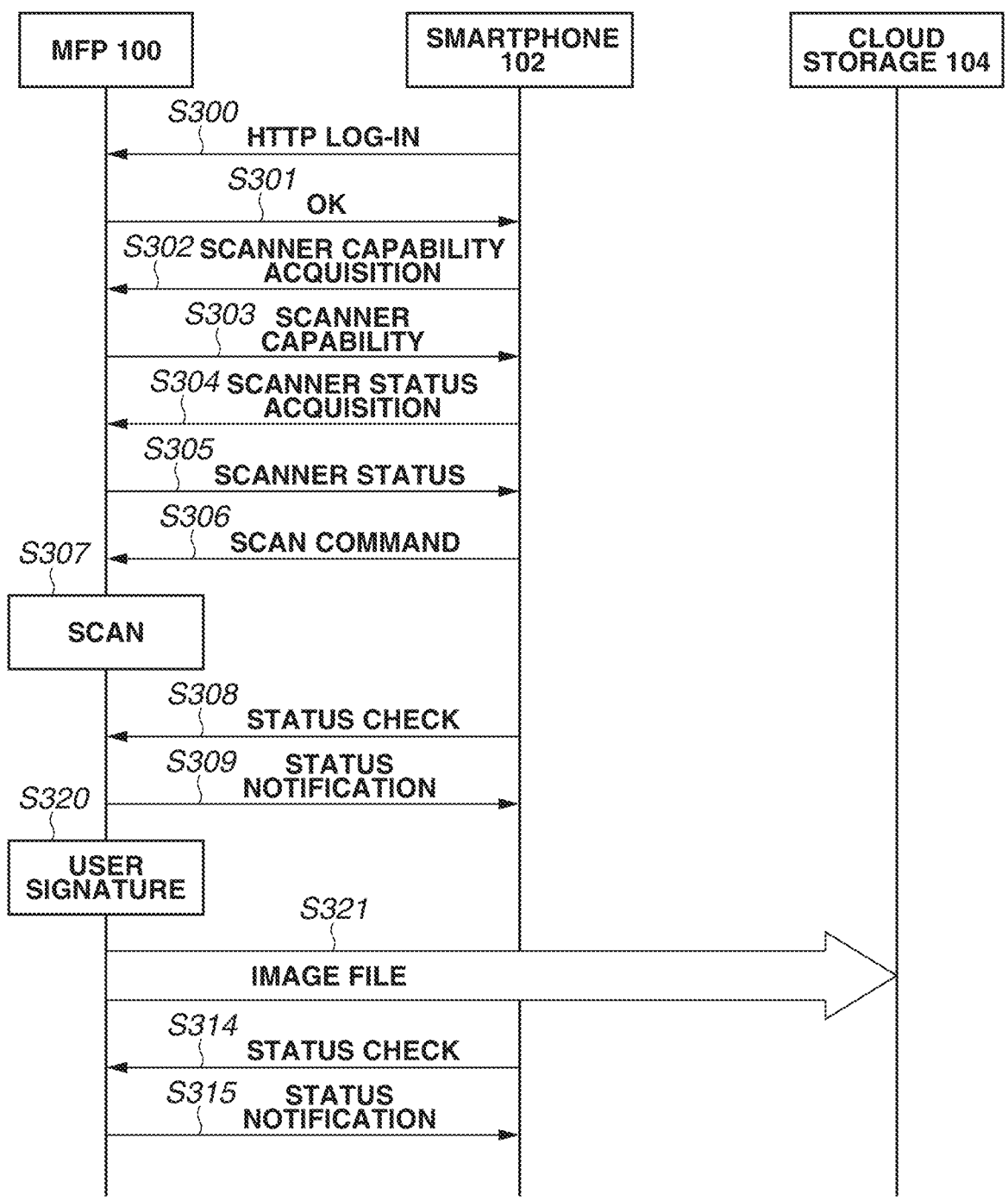
FIG. 6 illustrates a processing sequence for designating a user signature.

FIG. 6 illustrates processing sequences of each of the MFP 100, the smartphone 102, and the cloud storage 104 when "user signature" is designated in the PDF setting 256 and "cloud storage" is designated in the transmission destination 257. Steps identical to those illustrated in FIG. 5 are denoted by the same step numbers and the descriptions thereof are omitted.

If "user signature" is designated in the scan command setting (PDF setting 256), in step S320, the MFP 100 creates a user signature in which information about the user who has logged in the HTTP log-in operation in step S301 is described, and attaches the created user signature to PDF data created by scanning a document.

In step S321, the MFP 100 transmits the PDF image file created as described above to the cloud storage 104.

Figure 7:
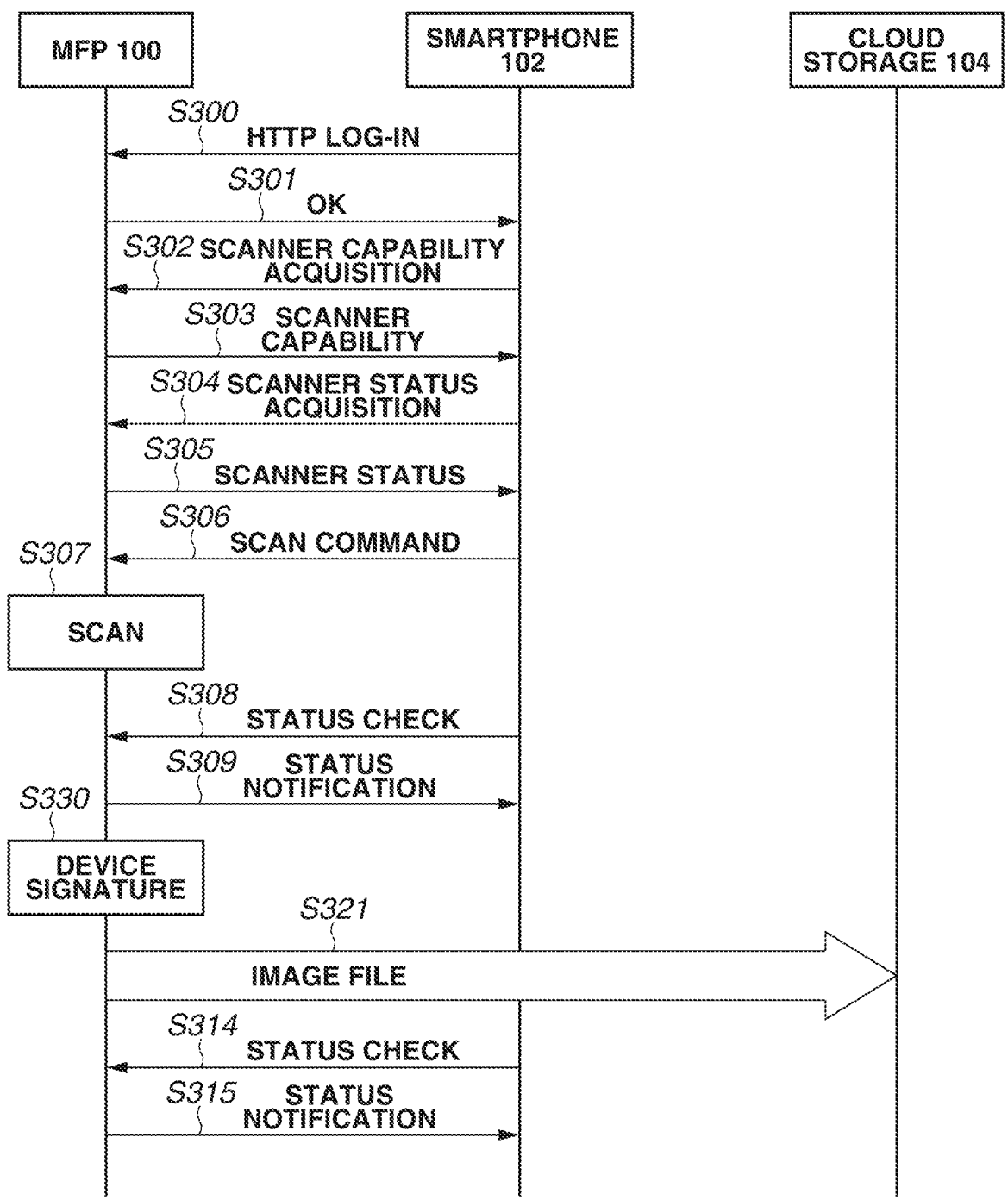
FIG. 7 illustrates a processing sequence for designating a device signature.

FIG. 7 illustrates processing sequences of each of the MFP 100, the smartphone 102, and the cloud storage 104 when "device signature" is designated in the PDF setting 256 and "cloud storage" is designated in the transmission destination 257. Steps identical to those illustrated in FIGS. 5 and 6 are denoted by the same step numbers and the descriptions thereof are omitted.

If "device signature" is designated in the scan command setting (PDF setting 256), in step S330, the MFP 100 creates a device signature in which the body number of the MFP 100 is described, and attaches the created device signature to PDF data created by scanning a document.

In step S321, the MFP 100 transmits the PDF image file created as described above to the cloud storage 104.

Figure 8:
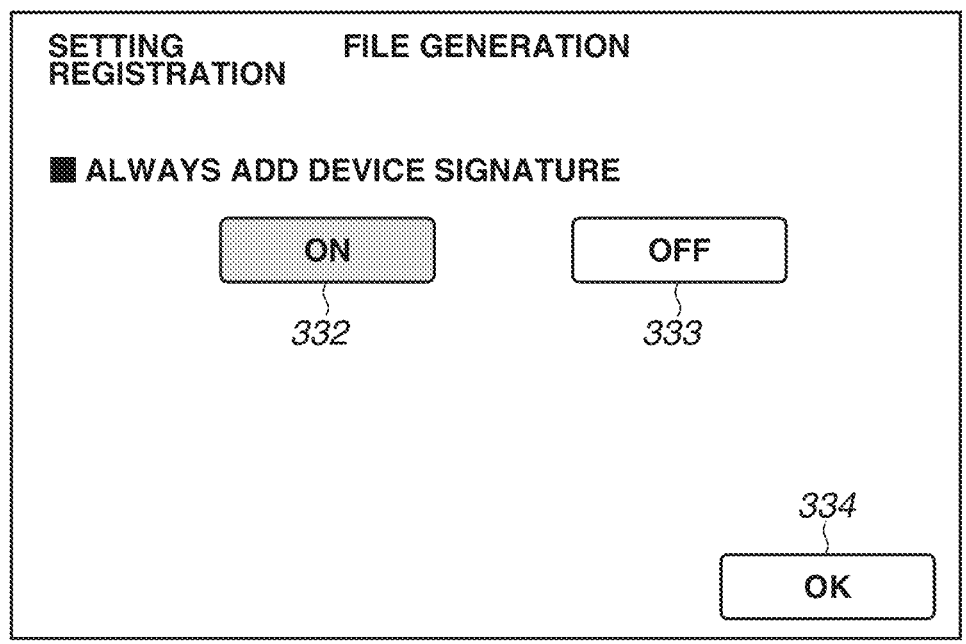
FIG. 8 illustrates an example of a setting registration screen for performing various settings for the MFP.

FIG. 8 illustrates an example of a setting registration screen for performing various settings for the MFP 100. This setting registration screen is displayed on the operation unit 133 under control of the CPU 130 in response to an operation from the operation unit 133 of the MFP 100.

Various settings can be made on the setting registration screen. For example, as illustrated in FIG. 8, an "always add device signature" setting can be made, for each file to be transmitted, by an administrator.

An ON button 332 is a button for turning on the "always add device signature" setting. An OFF button 333 is a button for turning off the "always add device signature" setting. If the "always add device signature" setting is turned on, in the case of transmitting an image file, the file to which device signature information is always added is transmitted.

An OK button 334 is pressed, the setting is registered (for example, stored in the flash ROM 131), and then this screen is closed.

Figure 9:
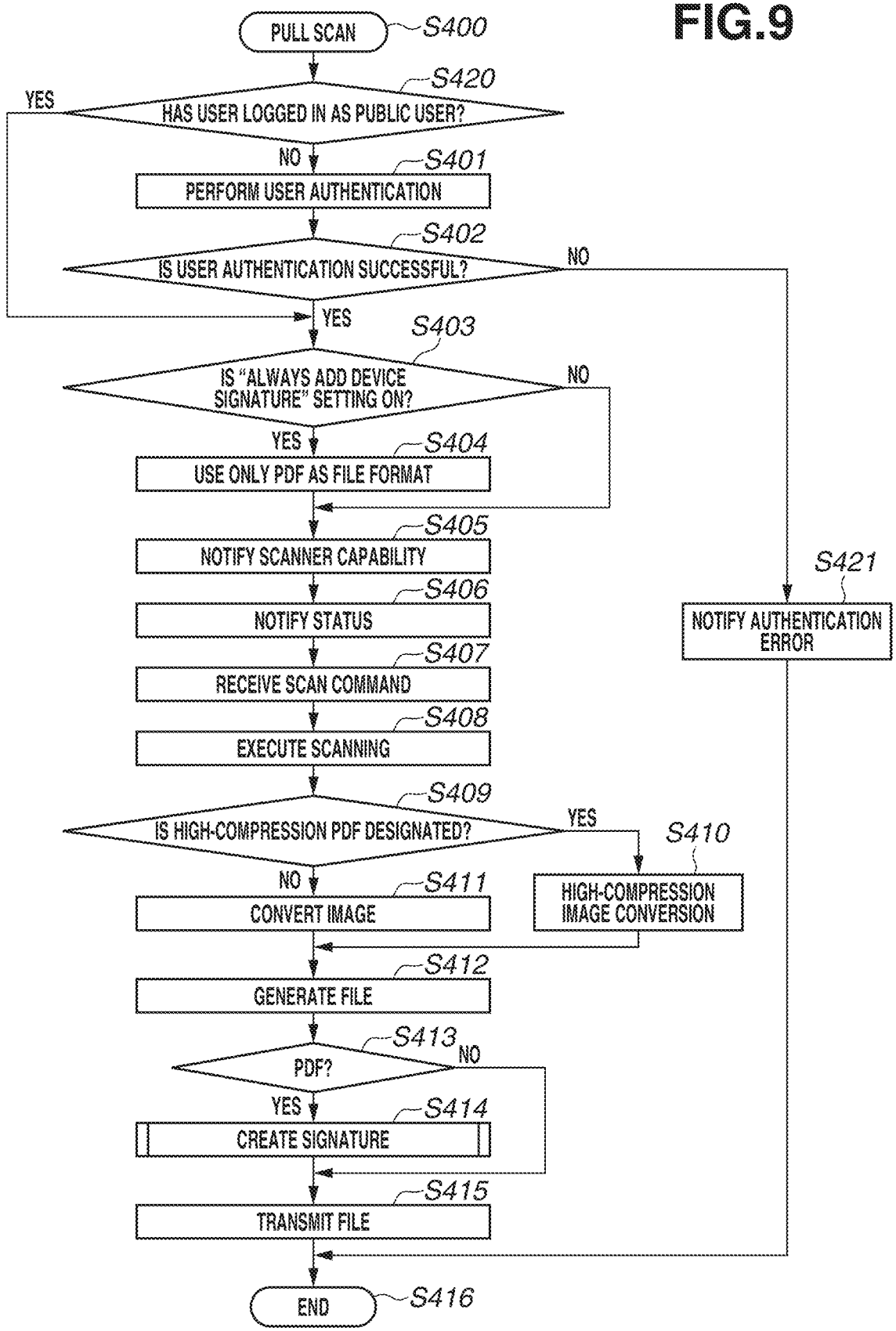
FIG. 9 is a flowchart illustrating an example of pull scan processing according to the present embodiment.

FIG. 9 is a flowchart illustrating an example of pull scan processing to be performed by the MFP 100 upon receiving the scan command from the smartphone 102. Processing in the flowcharts illustrated in FIG. 9 and FIG. 10 to be described below is implemented in such a manner that the CPU 130 of the MFP 100 reads a program stored in the flash ROM 131 or the like and executes the read program.

Upon receiving the HTTP log-in command issued from the smartphone 102 (corresponding to step S300 illustrated in FIGS. 5 to 7), in step S400, the CPU 130 starts pull scan processing. In step S420, the CPU 130 determines whether the user who logs in in response to the HTTP log-in command described above is a public user for whom no password is required and authentication is not performed. If the user is the public user (YES in step S420), the processing proceeds to step S403.

On the other hand, if the user is not the public user (NO in step S420), the processing proceeds to step S401.

In step S401, the CPU 130 performs user authentication.

In step S402, the CPU 130 determines whether the user authentication performed in step S401 described above is successful. If the user authentication is unsuccessful (NO in step S402), the processing proceeds to step S421.

In step S421, the CPU 130 notifies the smartphone 102 of an authentication error and then terminates the processing in the flowchart.

On the other hand, if the user authentication is successful in step S402 described above (YES in step S402), the CPU 130 sends a notification indicating that the authentication is OK, to the smartphone 102 (corresponding to step S301 illustrated in FIGS. 5 to 7), and then the processing proceeds to step S403.

In step S403, the CPU 130 determines whether the "always add device signature" setting described above with reference to FIG. 8 is ON or OFF. If the "always add device signature" setting is ON (YES in step S403), the processing proceeds to step S404.

In step S404, the CPU 130 excludes "JPEG" and "TIFF" from the options for the file format capability, so that only "PDF" and "high-compression PDF" can be selected, and then the processing proceeds to step S405. Since the signature cannot be added to JPEG and TIFF files, only PDF and high-compression PDF are set as file formats.

On the other hand, if the "always add device signature" setting is OFF in step S403 described above (NO in step S403), the processing proceeds to step S405.

In step S405, upon receiving the scanner capability acquisition command (corresponding to step S302 illustrated in FIGS. 5 to 7) from the smartphone 102, the CPU 130 notifies the smartphone 102 of the scanner capabilities including the file format capability described above (corresponding to step S303 illustrated in FIGS. 5 to 7). If only "PDF" and "high-compression PDF" are set as the file format capability, there are only two options, i.e., "PDF" and "high-compression PDF", for the file format 254 (FIG. 4) displayed on the smartphone 102. The scanner capabilities include not only the file formats described above, but also information to be described below. For example, information about the scanner capabilities include information indicating that automatic, A3, A4, LTR, or 11×17 can be set as the reading size, information indicating that 200 dpi, 300 dpi, 400 dpi, or 600 dpi can be set as the resolution, and information indicating that a device signature, a user signature, or a timestamp signature can be set as options for PDF.

Next, in step S406, upon receiving the scanner status acquisition command (corresponding to step S304 illustrated in FIGS. 5 to 7) from the smartphone 102, the CPU 130 notifies the smartphone 102 of the status (corresponding to step S305 illustrated in FIGS. 5 to 7). Examples of the status include a status where the scanner 134 is ready to perform scanning, and a status where the scanner 134 is not ready to perform scanning due to a sheet jam or the like. In the status where the scanner 134 is ready to perform scanning, the smartphone 102 issues the scan command (corresponding to step S306 illustrated in FIGS. 5 to 7).

In step S407, upon receiving a request including the scan command, the CPU 130 interprets this command, and then the processing proceeds to step S408.

In step S408, the CPU 130 controls scanning to be executed (corresponding to step S307 illustrated in FIGS. 5 to 7). For example, the CPU 130 issues the scan command to the SOC 139. The SOC 139 which has received the scan command causes a program stored in the flash ROM 131 to run to start scanning using the RAM 145, the scanner 134, and the ADF 150.

Next, in step S409, the CPU 130 determines whether "high-compression PDF" is designated as the file format 254 included in the scan command received in step S407 described above. If "high-compression PDF" is designated (YES in step S409), the processing proceeds to step S410.

In step S410, the CPU 130 requests the SOC 139 to perform high-compression image conversion. The SOC 139 uses the RAM 145 and the image processing circuit 136, separates the area of an image into a text area and a picture area, and performs image conversion with an appropriate resolution for each area.

On the other hand, in step S409 described above, if the file format received in step S407 described above is not "high-compression PDF" (NO in step S409), the processing proceeds to step S411.

In step S411, the CPU 130 requests the SOC 139 to perform image conversion. The SOC 139 uses the RAM 145, the image processing circuit 136, and the like to perform image processing, such as MMR compression in the case of a black and white binary image, and JPEG compression in the case of full-color and grayscale images.

After step S410 or step S411 described above, in step S412, the CPU 130 generates a file of the file format designated in the file format 254 from the image obtained after the conversion in step S410 or step S411 described above.

Next, in step S413, the CPU 130 determines whether the format of the file generated in step S412 described above is "PDF". If the file format is not "PDF" (NO in step S413), the processing proceeds to step S415.

On the other hand, if the file format is "PDF" (YES in step S413), the processing proceeds to step S414.

In step S414, the CPU 130 performs signature creation processing (to be described in detail below with reference to FIG. 10), and attaches the created signature to the file generated in step S412 described above, and then the processing proceeds to step S415.

In step S415, the CPU 130 transmits the file generated in step S412 described above (the file to which the signature is added in step S414 described above) to the smartphone 102 or the cloud storage 104 (corresponding to step S313 illustrated in FIG. 5, or step S321 illustrated in FIGS. 6 and 7). After step S415, the CPU 130 terminates the processing in the flowchart.

Figure 10:
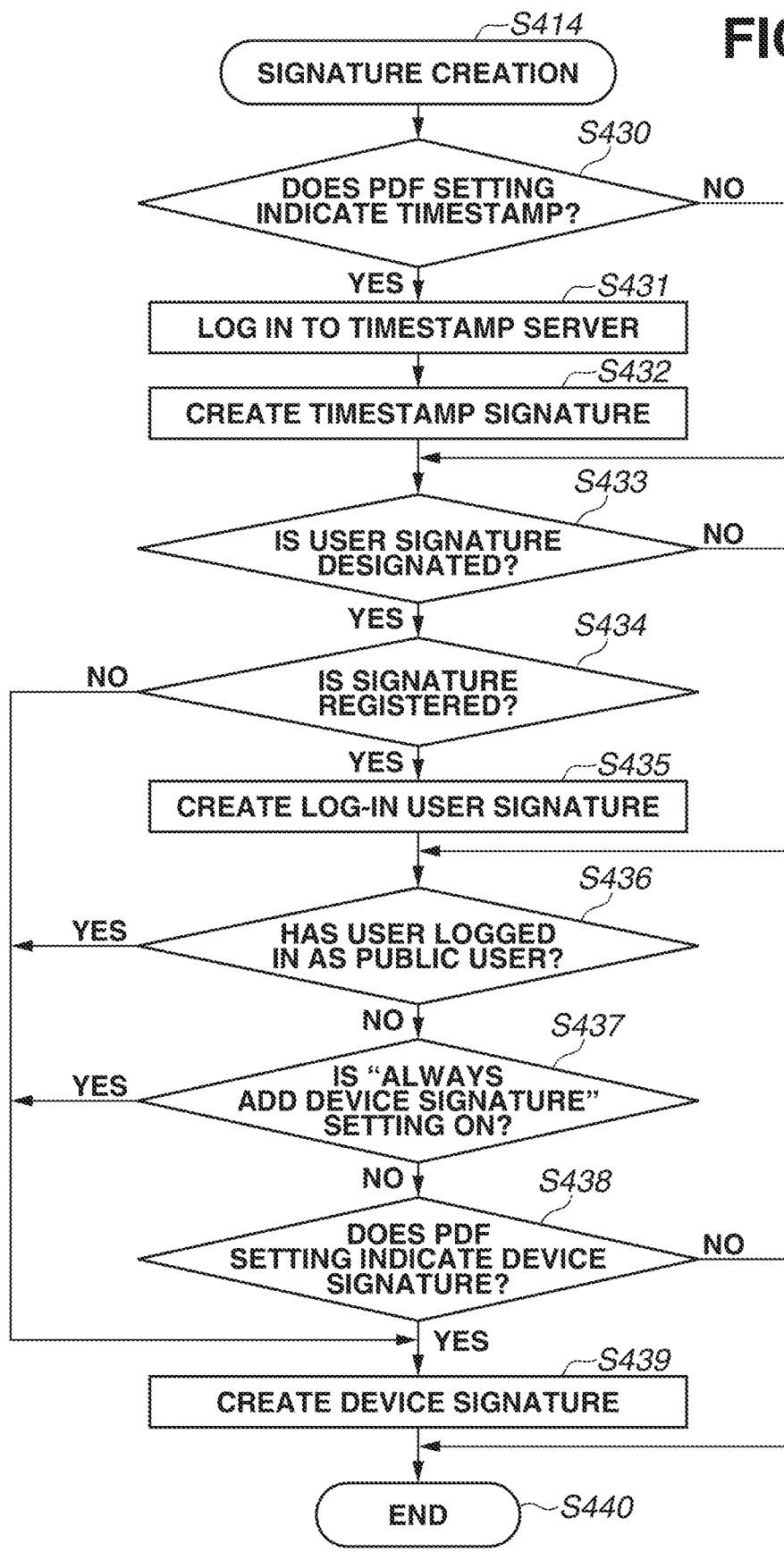
FIG. 10 is a flowchart illustrating an example of signature creation processing according to the present embodiment.

FIG. 10 is a flowchart illustrating an example of the signature creation processing performed in step S414 illustrated in FIG. 9.

First, in step S430, the CPU 130 determines whether the PDF setting 256 included in the scan command received in step S407 illustrated in FIG. 9 indicates "timestamp". If the PDF setting 256 does not indicate "timestamp" (NO in step S430), the processing proceeds to step S433.

On the other hand, if the PDF setting 256 indicates "timestamp" (YES in step S430), the processing proceeds to step S431.

In step S431, the CPU 130 logs in to the timestamp server 105. In response to the log-in operation, the timestamp server 105 returns accurate time information to the MFP 100. Upon receiving the accurate time information from the timestamp server 105, in step S432, the CPU 130 creates a timestamp signature in which the time information is described, and attaches the created timestamp signature to the scanned data (the file generated in step S412 illustrated in FIG. 9), and then the processing proceeds to step S433.

In step S433, the CPU 130 determines whether "user signature" is designated as the PDF setting 256 in the request including the scan command received in step S407 illustrated in FIG. 9. If "user signature" designated as the PDF setting is not included (NO in step S433), the processing proceeds to step S436.

On the other hand, if "user signature" designated as the PDF setting is included (YES in step S433), the processing proceeds to step S434.

It is necessary to preliminarily register a certificate for an authenticated user in the MFP 100. Accordingly, if this registration process is omitted, the user signature cannot be attached. Therefore, in step S434, the CPU 130 determines whether the certificate for the authenticated user is registered (signature is registered). If the certificate for the authenticated user is not registered (NO in step S434), the processing proceeds to step S439. Specifically, when the certificate for the authenticated user is not registered, the processing proceeds to step S439 to be described below to perform an operation to attach the device signature, regardless of the "always add device signature" setting.

On the other hand, if the certificate for the authenticated user is registered (YES in step S434), the processing proceeds to step S435.

In step S435, the CPU 130 creates the signature of the log-in user and attaches the created signature to the scanned data, and then the processing proceeds to step S436.

In step S436, the CPU 130 determines whether the log-in user is a public user. If the user is a public user (YES in step S436), the processing proceeds to step S439 to perform an operation to attach the device signature. Any public user can use the data and the public user cannot be identified, and thus there is a risk of leakage of information. For this reason, the processing proceeds to step S439 to be described below to perform an operation to attach the device signature, regardless of the "always add device signature" setting. In this manner, the device signature is attached even when the signature setting is not made by the public user and the device which has executed scanning is identified. This leads to an improvement in security. If the user authentication is also not performed for users other than the public user, the same advantageous effects as those described above can be obtained by attaching the device signature.

On the other hand, if the user is not a public user (NO in step S436), the processing proceeds to step S437.

In step S437, the CPU 130 determines whether the "always add device signature" setting is ON or OFF. If the "always add device signature" setting is ON (YES in step S437), the processing proceeds to step S439 to perform an operation to attach the device signature. Thus, the administrator of the device turns on the "always add device signature" setting to attach information about the body number of the device that has executed scanning to a PDF file when a scan instruction is sent from the smartphone 102. This leads to an improvement in security.

On the other hand, if the "always add device signature" setting is OFF (NO in step S437), the processing proceeds to step S438.

In step S438, the CPU 130 determines whether the PDF setting 256 included in the scan command received in step S407 illustrated in FIG. 9 indicates "device signature". If the PDF setting 256 does not indicate "device signature" (NO in step S438), the CPU 130 terminates the processing in the flowchart.

On the other hand, if the PDF setting 256 indicates "device signature" (YES in step S438), the processing proceeds to step S439.

In step S439, the CPU 130 creates a device signature based on the information about the body number of the device, attaches the created device signature to the scanned data, and then terminates the processing in the flowchart.

Figure 11:
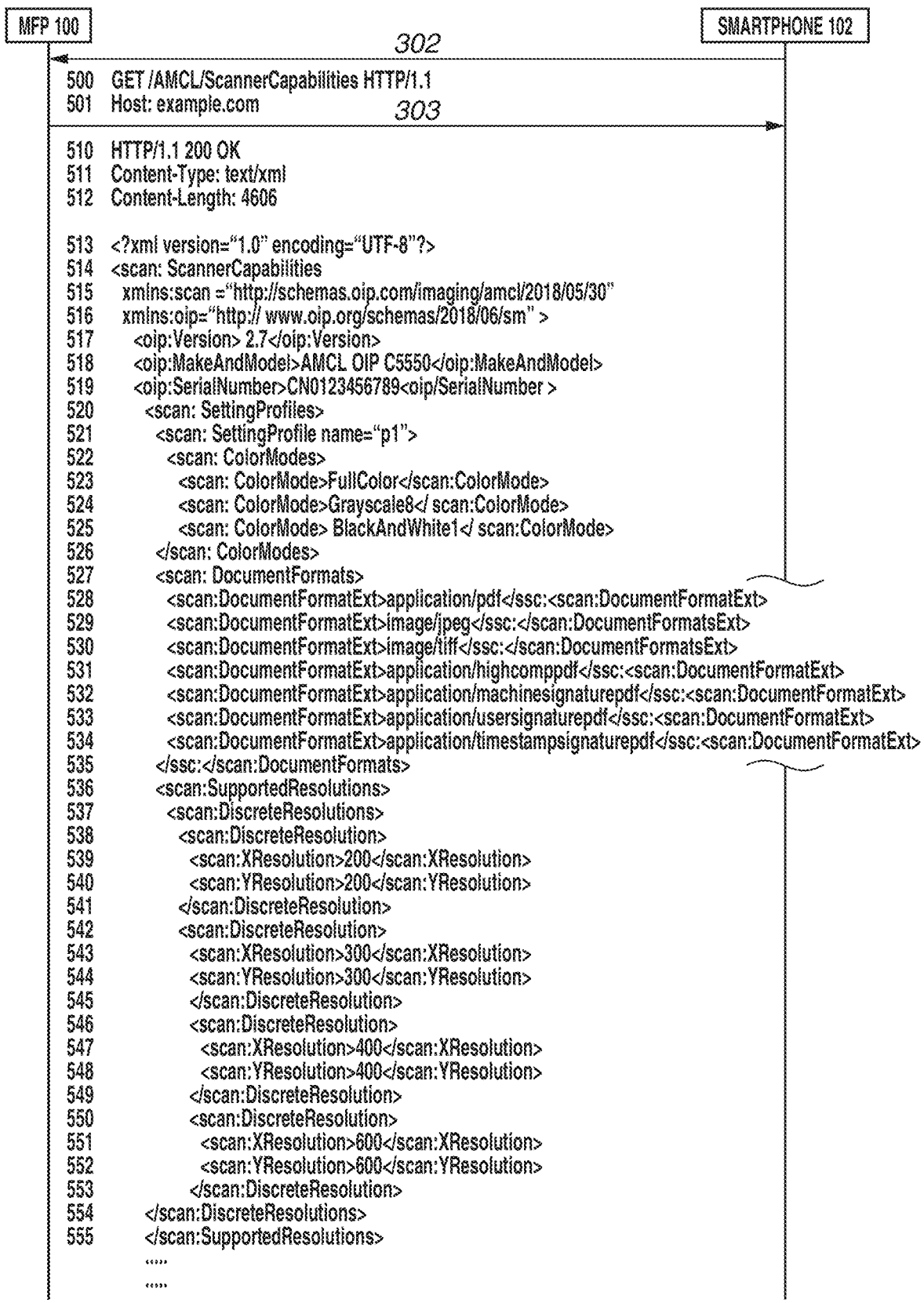
FIG. 11 illustrates data on a scanner capability acquisition command and some of scanner capabilities.

FIG. 11 specifically illustrates data on the scanner capability acquisition command (corresponding to step S302 illustrated in FIGS. 5 to 7) and some of the scanner capabilities (corresponding to step S303 illustrated in FIGS. 5 to 7).

The scanner capability acquisition command issued in step S302 illustrated in FIGS. 5 to 7 is a GET command in the HTTP protocol as indicated by 500 in FIG. 11. The scanner capability acquisition command is a command for acquiring scanner capabilities from the description of "ScannerCapabilities". 501 indicates a HOST header.

Information about the scanner capabilities notified in step S303 illustrated in FIGS. 5 to 7 is information as indicated by 510 to 555, and is Extensible Markup Language (XML) data in the HTTP as indicated by 510 and 511.

For example, 522 to 526 correspond to color mode capability information. In particular, the data 523 indicates that the scanner 134 has the capability of performing scanning in full-color, the data 524 indicates that the scanner 134 has the capability of performing scanning in grayscale, and the data 525 indicates that the scanner 134 has the capability of performing scanning in monochrome.

If the smartphone 102 acquires the data indicated by 522 to 526, the data is displayed in the color mode 252 illustrated in FIG. 4 such that the items of "full-color", "gray", and "monochrome" can be selected.

The data indicated by 527 to 534 correspond to data associated with the file format capability. In particular, the data 528 indicates that the capability of generating "PDF" as the file format is included, the data 529 indicates that the capability of generating "JPEG" as the file format is included, the data 530 indicates that the capability of generating "TIFF" as the file format is included, the data 531 indicates that the capability of generating "high-compression PDF" as the file format is included, the data 533 indicates that the capability of generating "PDF with a user signature" as the file format is included, and the data 534 indicates that the capability of generating "PDF with a timestamp" as the file format is included.

If the smartphone 102 acquires the data indicated by 527 to 534, the data is displayed in the file format 254 illustrated in FIG. 4 such that the items of "PDF", "high-compression PDF", "JPEG", and "TIFF" can be selected. Further, the data is displayed in the PDF setting 256 such that the items of "device signature", "user signature", and "timestamp" can be selected.

If the "always add device signature" setting is ON, information indicating the file format capabilities indicated by the data 529 and 530 is excluded, thereby performing control in such a manner that the items of "JPEG" and "TIFF" cannot be selected in the file format 254 of the smartphone 102.

In the present embodiment, detailed PDF settings, such as high-compression, device signature, user signature, and timestamp, are distinguished based on the file format as indicated by 531 to 534. Regarding this part, in the document format, an item such as "PdfOption" is created using "application/pdf", and, for example, "highcomp", "machine-signature", "usersignature", and "timestampsignature" may be set.

Each piece of data 536 to 555 indicates the capability associated with a resolution and defines a resolution in an X-direction and a resolution in a Y-direction. If the smartphone 102 acquires the data indicated by 536 to 555, the data is displayed in the resolution 251 illustrated in FIG. 4 such that the items of "200 dpi", "300 dpi", "400 dpi", and "600 dpi" can be selected.

Although not illustrated, data indicating the capabilities corresponding to the reading size 250, the document place 255, and the like illustrated in FIG. 4 are also present in the scanner capability data, and the smartphone 102 performs a display operation as illustrated in FIG. 4 based on these pieces of capability information.

Figure 12:
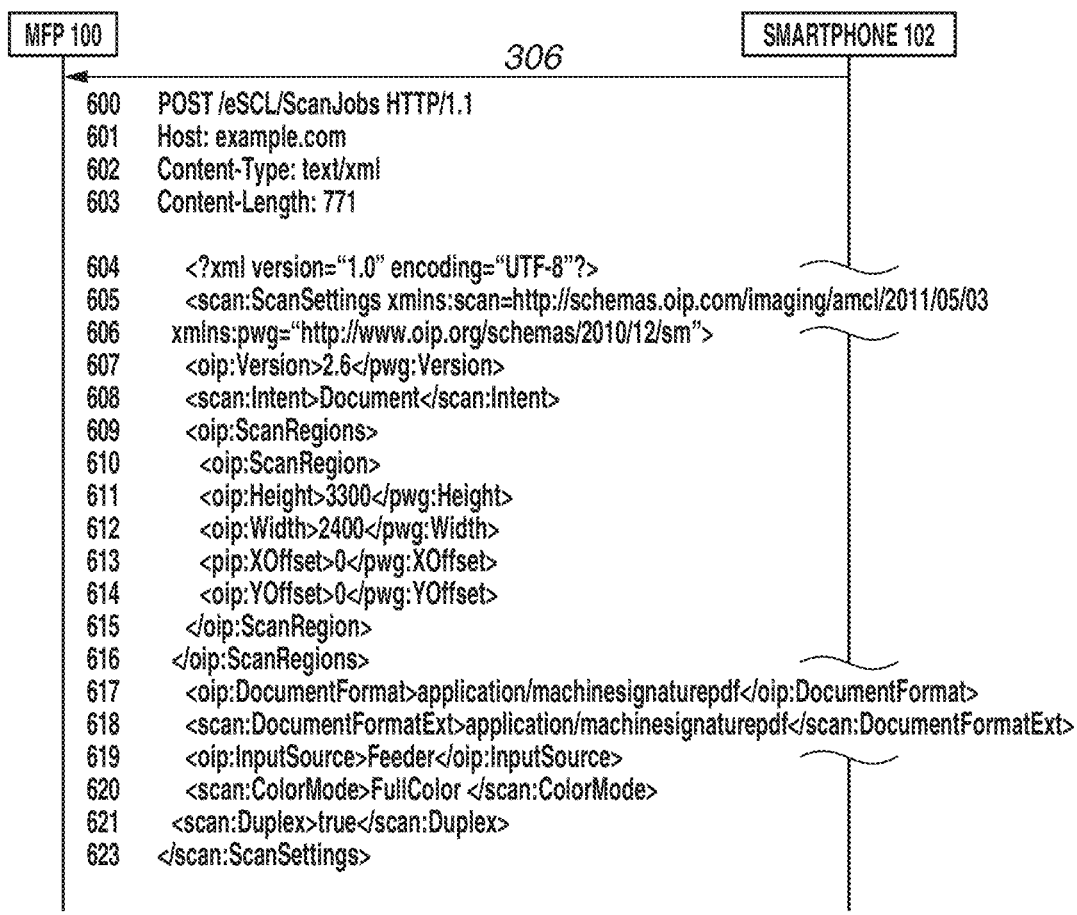
FIG. 12 illustrates data on a scan command.

FIG. 12 illustrates a specific example of data on the scan command (corresponding to step S306 illustrated in FIGS. 5 to 7). The scan command is sent to the MFP 100 when the user performs various settings from the screen illustrated in FIG. 4 on the smartphone 102 and presses the scan button 258.

As the scan command issued in step S306 illustrated in FIGS. 5 to 7, a Power-On Self Test (POST) command in the HTTP protocol is used, and thus a command as indicated by 600 is sent from the smartphone 102 to the MFP 100. Data 601 to 603 indicates HTTP headers including a HOST name, content type and content length. Data 604 to 623 indicates designations corresponding to the scan settings performed by the user.

For example, each piece of data 609 to 616 designates the number of pixels in an area to be scanned. This is the number of pixels calculated based on the information about the resolution 251 and the reading size 250 input by the user. This example indicates that the number of pixels in the longitudinal direction is 3300 pixels, the number of pixels in the horizontal direction is 2400 pixels, and offsets in the longitudinal and horizontal directions are 0.

Each piece of data 617 and 618 is used to designate the file format of a document to be scanned. This example corresponds to a case where the user sets "PDF" in the file format 254 and sets "device signature" in the PDF setting 256. When "user signature" is set in the PDF setting 256, a value indicated by 617 is "usersignaturepdf". When "timestamp" is set in the PDF setting 256, a value indicated by 618 is "application/timestampsignaturepdf".

Each piece of data 619 and 621 indicates a value set in the document place 255. This example corresponds to a case where "ADF/double-sided" is set. A value indicated by 620 is set in the color mode 252. This example corresponds to a case where "full-color" is set.

Upon receiving the scan command as described above, the MFP 100 executes the scan operation (corresponding to step S307 illustrated in FIGS. 5 to 7).

The embodiment described above illustrates a configuration in which the device signature is attached to data acquired by executing scanning of a document when the "always add device signature" setting illustrated in FIG. 8 is ON. However, it is also possible to employ a configuration in which an "always add device signature or user signature" setting may be made and when this setting is ON, at least one of electronic signatures, including a device signature and a user signature, may be attached to data acquired by executing scanning of a document.

According to the embodiment described above, user authentication is performed when scanning is executed from the smartphone 102, and a signature of an authenticated user, or a signature in which a body number of a device that has executed scanning is described is attached to the scanned data, thereby making it possible to close loopholes for leakage of classified documents.

Therefore, it is possible to attach an electronic signature to a file including data acquired by executing scanning of a document even when scanning of the document is executed in response to a request from a communication terminal, such as a smartphone. This configuration enhances the security and acts as a deterrent against leakage of documents.

The configurations and contents of various kinds of data described above are not limited to those described above, and various configurations and contents may be used depending on the applications and purposes.

While embodiments of the present invention have been described above, the present invention can be embodied as, for example, a system, an apparatus, a method, a program, a storage medium, or the like. Specifically, the present invention is applicable to a system configured using a plurality of devices, and is also applicable to an apparatus configured using a single device.

All configurations obtained by combining the embodiments as needed are also included in the present invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Application No. 2018-194861, filed Oct. 16, 2018, which is hereby incorporated by reference herein in its entirety.

What is claimed is:

1. An information processing apparatus configured to scan a document, the information processing apparatus comprising:
at least one memory storing instructions; and
at least one processor executing the instructions causing the information processing apparatus to:
perform a setting to attach a device signature to a file including data acquired by executing scanning of a document, wherein the setting indicates that the device signature is to always be attached to the file, even in a case where a request, from a communication terminal, for scanning the document does not include a designation to attach the device signature;
receive the request for scanning the document from the communication terminal via a network;
in a case where the request includes the designation to attach the device signature, attach the device signature to the file including the data acquired by executing scanning of the document in response to the request;
in a case where the request does not include the designation to attach the device signature, attach the device signature to the file based on the setting; and
transmit the file to which the device signature is attached to one of the communication terminal and a designated destination, based on a transmission destination included in the received request,
and
wherein the information processing apparatus is a scanner or a multi-function peripheral.

2. The information processing apparatus according to claim 1, wherein in a case where a designation to attach a user signature is included in the request, the user signature corresponding to an authenticated user is further attached to the file by using a certificate for the authenticated user that is registered in the information processing apparatus.

3. The information processing apparatus according to claim 1, wherein in a case where the request includes no designation to attach a user signature, the device signature is attached to the file without attaching the user signature.

4. The information processing apparatus according to claim 1, wherein in a case where a user corresponding to the request is a public user for whom no authentication is required, the device signature is attached to the file.

5. The information processing apparatus according to claim 1, wherein the instructions further cause the information processing apparatus to attach a timestamp to the file.

6. The information processing apparatus according to claim 1, wherein the communication terminal is a smartphone.

7. The information processing apparatus according to claim 1, wherein the instructions further cause the information processing apparatus to send, to the communication terminal, a notification including capability information indicating a capability of attaching the device signature to the file as a part of capabilities of the information processing apparatus.

8. The information processing apparatus according to claim 7, wherein the request includes a plurality of designations based on the capability information included in the notification.

9. The information processing apparatus according to claim 7, wherein in a case where the setting is performed to attach the device signature to the file, a file format that does not support the attachment of the device signature is excluded from the capability information included in the notification, the capability information being associated with scanning.

10. A control method for an information processing apparatus, wherein the information processing apparatus is a scanner or a multi-function peripheral, the control method comprising:

performing a setting to attach a device signature to a file including data acquired by executing scanning of a document, wherein the setting indicates that the device signature is to always be attached to the file, even in a case where a request, from a communication terminal, for scanning the document does not include a designation to attach the device signature;

receiving the request for scanning the document from the communication terminal via a network;

in a case where the request includes the designation to attach the device signature, attaching the device signature to the file including the data acquired by executing scanning of the document in response to the request;

in a case where the request does not include the designation to attach the device signature, attaching the device signature to the file based on the setting; and transmitting the file to which the device signature is attached to one of the communication terminal and a designated destination, based on a transmission destination included in the received request.

11. A non-transitory computer readable storage medium on which is stored a computer program for making a computer execute a control method for an information processing apparatus, wherein the information processing apparatus is a scanner or a multi-function peripheral, the control method comprising:

performing a setting to attach a device signature to a file including data acquired by executing scanning of a document, wherein the setting indicates that the device signature is to always be attached to the file, even in a case where a request, from a communication terminal, for scanning the document does not include a designation to attach the device signature;

receiving the request for scanning the document from the communication terminal via a network;

in a case where the request includes the designation to attach the device signature, attaching the device signature to the file including the data acquired by executing scanning of the document in response to the request;

in a case where the request does not include the designation to attach the device signature, attaching the device signature to the file based on the setting; and transmitting the file to which the device signature is attached to one of the communication terminal and a designated destination, based on a transmission destination included in the received request.

\* \* \* \* \*